United States Patent
Mohan

(10) Patent No.: US 9,801,061 B2
(45) Date of Patent: Oct. 24, 2017

(54) MULTI-FACTOR USER AUTHENTICATION BASED ON DECOY SECURITY QUESTIONS

(71) Applicant: CA, INC., New York, NY (US)

(72) Inventor: Badrinath Mohan, Bangalore (IN)

(73) Assignee: CA, INC., New York, NY (US)

( * ) Notice: Subject to any disclaimer, the term of this patent is extended or adjusted under 35 U.S.C. 154(b) by 126 days.

(21) Appl. No.: 14/971,556

(22) Filed: Dec. 16, 2015

(65) Prior Publication Data

US 2017/0180986 A1 Jun. 22, 2017

(51) Int. Cl.
*G06F 21/00* (2013.01)
*H04W 12/06* (2009.01)
*H04L 29/06* (2006.01)
*G06F 17/30* (2006.01)

(52) U.S. Cl.
CPC ...... *H04W 12/06* (2013.01); *G06F 17/30867* (2013.01); *H04L 63/083* (2013.01)

(58) Field of Classification Search
CPC ................. G06F 21/00; G06F 17/30867
See application file for complete search history.

(56) References Cited

U.S. PATENT DOCUMENTS

| | | | | |
|---|---|---|---|---|
| 8,087,068 B1* | 12/2011 | Downey | ............... | H04L 63/083 726/4 |
| 8,140,847 B1* | 3/2012 | Wu | ..................... | G06F 21/6218 713/175 |
| 8,988,350 B2* | 3/2015 | Karmarkar | ............... | G06F 3/013 345/158 |
| 9,025,834 B2* | 5/2015 | Hang | ..................... | G06F 21/36 382/115 |
| 9,674,195 B1* | 6/2017 | Jiang | ..................... | H04L 63/10 |
| 2012/0214442 A1* | 8/2012 | Crawford | ............... | H04W 12/06 455/411 |
| 2013/0044055 A1* | 2/2013 | Karmarkar | ............... | G06F 3/013 345/158 |
| 2015/0180829 A1* | 6/2015 | Yu | ......................... | G06F 21/31 726/11 |
| 2015/0381598 A1* | 12/2015 | Koved | ................... | H04L 63/08 726/3 |
| 2016/0105420 A1* | 4/2016 | Engan | ................... | H04L 9/3228 455/411 |

(Continued)

*Primary Examiner* — Ali Shayanfar
(74) *Attorney, Agent, or Firm* — Sage Patent Group

(57) ABSTRACT

A method on an account server processor includes retrieving from an accounts database a registered security question associated with an account identifier received from a user terminal, retrieving decoy security questions from the accounts database, and generating and communicating an authentication query message containing the registered security question and the decoy security questions toward the user terminal. An authentication response message containing an answer from a user to at least the registered security question is received from the user terminal. A registered answer associated with the account identifier is retrieved from the accounts database. Electronic access by an access request message from the user terminal to information stored in the accounts database, is selectively allowed based on whether the answer to the registered security question matches the registered answer and whether another answer from the user to any of the decoy security questions is contained in the authentication response message.

18 Claims, 8 Drawing Sheets

(56) References Cited

U.S. PATENT DOCUMENTS

2016/0359838 A1* 12/2016 Dasgupta .............. H04L 63/083
2016/0381080 A1* 12/2016 Reddem ............. H04L 63/0884
                                                              726/1
2017/0034164 A1*  2/2017 Khalil ................. H04L 63/0876

* cited by examiner

Authentication Response Message Content

Answer(s);
Elapsed time(s) associated with user entering answer(s) and/or individual characters of answer(s);
Indication of sequential order of user answer(s) to displayed security questions

MULTI-FACTOR USER AUTHENTICATION BASED ON DECOY SECURITY QUESTIONS

BACKGROUND

The present disclosure relates to electronic devices and, more particularly, to user interfaces for portable electronic devices.

Passwords remain the dominant means of authentication in computer systems because of their simplicity, legacy deployment and ease of revocation. Unfortunately, common approaches to entering passwords by way of keyboard, mouse, touch screen or any traditional input device, are frequently vulnerable to attacks such as shoulder surfing and password snooping.

Shoulder-surfing is an attack on password authentication that has traditionally been hard to defeat. It can be done remotely using binoculars and cameras, using keyboard acoustics, or embedded keystroke tracking software. Access to the user's password simply by observing the user while he or she is entering a password undermines the effort put into encrypting passwords and protocols for authenticating the user securely. To some extent, the human actions when inputting the password are the weakest link in the chain.

SUMMARY

Some embodiments of the present disclosure are directed to a method of performing operations on an account server processor. The operations include retrieving from an accounts database a registered security question that is associated with an account identifier received from a user terminal, retrieving decoy security questions from the accounts database, generating an authentication query message containing the registered security question and the decoy security questions, and communicating the authentication query message toward the user terminal operated by a user. The operations further include receiving from the user terminal an authentication response message containing an answer from the user to at least the registered security question and retrieving from the accounts database a registered answer that is associated with the account identifier. Electronic access by an access request message from the user terminal to information stored in a data structure associated with the account identifier within the accounts database, is selectively allowed based on whether the answer contained in the authentication response message to the registered security question matches the registered answer and based on whether another answer from the user to any of the decoy security questions is contained in the authentication response message.

Some other embodiments of the present disclosure are directed to an account server that includes a user interface, a processor, and a memory coupled to the processor and storing computer readable program code that when executed by the processor causes the processor to perform operations. The operations include retrieving from an accounts database a registered security question that is associated with an account identifier received from a user terminal, retrieving decoy security questions from the accounts database, generating an authentication query message containing the registered security question and the decoy security questions, and communicating the authentication query message toward the user terminal operated by a user. The operations further include receiving from the user terminal an authentication response message containing an answer from the user to at least the registered security question and retrieving from the accounts database a registered answer that is associated with the account identifier. Electronic access by an access request message from the user terminal to information stored in a data structure associated with the account identifier within the accounts database, is selectively allowed based on whether the answer contained in the authentication response message to the registered security question matches the registered answer and based on whether another answer from the user to any of the decoy security questions is contained in the authentication response message.

Other methods, account servers, and user terminals according to embodiments of the inventive subject matter will be or become apparent to one with skill in the art upon review of the following drawings and detailed description. It is intended that all such additional methods, account servers, and user terminals be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

Figure 1:
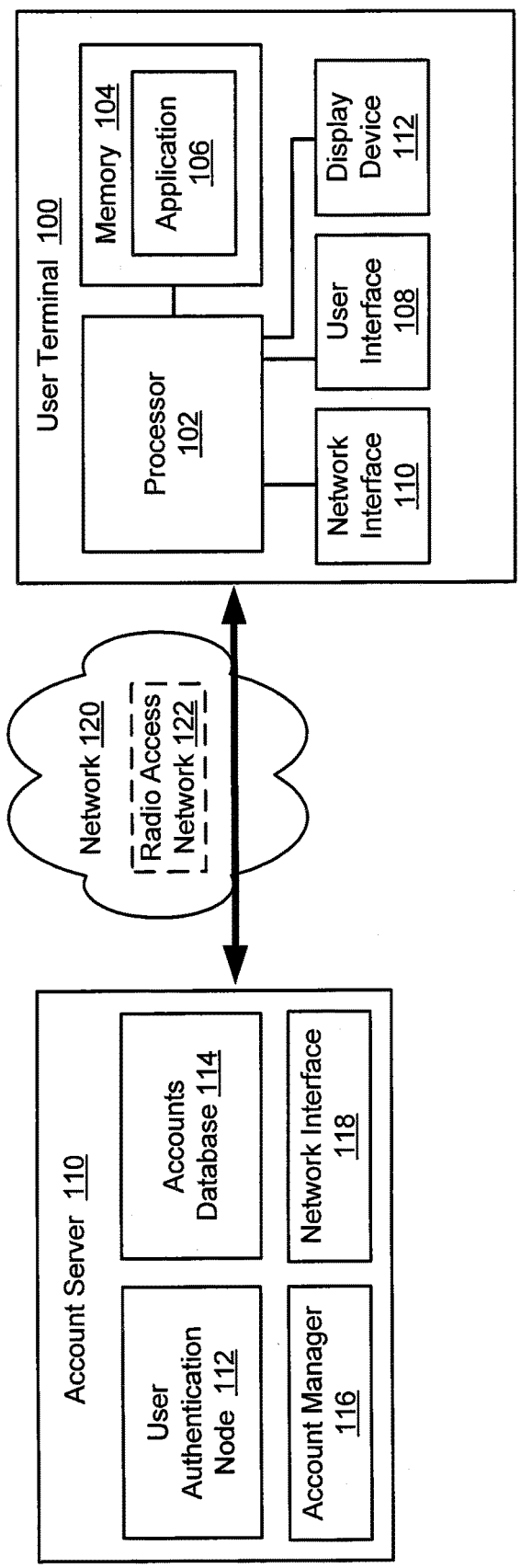
FIG. 1 is a block diagram of a user terminal and an account server that can authenticate a user who is operating the user terminal according to some embodiments of the present disclosure.

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

As explained above, password entry remains a weakness in efforts to improve user authentication effectiveness. Some systems attempt to authenticate users through a combination of requiring a user to enter a valid password and to correctly answer security questions that are displayed on the user terminal. One security weakness with this approach is that the security questions may be properly guessed by someone who has sufficient background knowledge of the person to answer common security questions related to, for example, the city where the user last went to school, the user's mother's maiden name, the user's pet name, etc. These known approaches for user authentication require that all or a defined number of the displayed security questions be properly answered.

Various embodiments of the present disclosure are directed to providing more multi-factor authentication of users through use of decoy security questions which are displayed in combination with one or more registered security questions, and knowledge of the authentic user to only answer the one or more registered security questions that the authentic user recognizes. In other words, in one embodiment, any user who provides an answer to any of the decoy security questions is determined by an user authentication node of an account server to not be an authentic user and any attempted access by such non-authentic user to information stored in an accounts database is prevented.

In this manner, real (registered) security questions can be mixed in with decoy (fake) security questions to trick a hacker. An authentic user recognizes the real security questions from among the set including the decoy security questions. The authentic user can then properly answer only the real security questions and may either not answer or provide dummy answers to the decoy security questions. In contrast, the hacker may not be aware of the presence of the decoy security questions and, even in aware of their presence, would not be able to identify which questions are real versus decoy. The hacker may attempt to perform searches through social media websites, etc. in order to answer all questions. Such attempt hacking becomes more laborious and time consuming for the hacker. Moreover, the hacker's responses to all questions can signal to the security system that the answers were provided by a hacker instead of the authentic user. The system can responsively deny access to the hacker.

FIG. 1 is a block diagram of a user terminal 100 and an account server 110 that can authenticate a user who is operating the user terminal 110 according to some embodiments of the present disclosure. Referring to FIG. 1, the account server 110 communicates with the user terminal 100 through a data network 120 that may include wired (e.g., private or public wide area network (e.g, Internet)) and/or wireless network elements. For example, the data network 120 may include a radio access network 122 that communicates with the account server 110 and/or the user terminal 100 using one or more wireless communication protocols, such as WLAN, WiMax, LTE or other cellular, etc. The user terminal 100 may be any electronic device that can communicate with the account server 110, such as a smart phone, tablet computer, laptop computer, desktop computer, gaming console, etc.

The illustrated user terminal 100 includes a processor 102, a memory 104, a user interface 108, a network interface 110, and a display device 112. The network interface 110 may include a radio access network transceiver and/or a wired network interface (e.g., Ethernet interface). The user interface 108 may include a keyboard, touch screen input interface, speaker, and/or microphone. The processor 102 may include one or more data processing circuits, such as a general purpose and/or special purpose processor (e.g., microprocessor and/or digital signal processor) that may be collocated or distributed across one or more networks. The processor 102 is configured to execute computer program code 106 in the memory 104, described below as a non-transitory computer readable medium, to perform at least some of the operations described herein as being performed by a user terminal.

The account server 110 may include an accounts database 114, a user authentication node 112, an account manager 116, and a network interface 118. The network interface 118 communicates with the user terminal 100 through the data network 120. The accounts database 114 is a data repository that stores user credentials, such as user account identifiers and corresponding passwords, in data structures with logical associations to the account identifiers. The user authentication node 112 operates to validate an account identifier and credentials received in authentication query messaging from the user terminal 100. When a user is properly authenticated by the user authentication node 112, the account manager 116 allows the user terminal 100 to access information (e.g., user data, media content, etc.) residing in the accounts database 114 associated with the account identifier or otherwise made accessible to authenticated users. Selective information access can be provided by the account manager 116 selectively passing information request query messages from the user terminal 100 to the accounts database 114.

In one embodiment, an account server processor retrieves from the accounts database 114 a registered security question that is associated with an account identifier received from the user terminal 100. The processor also retrieves decoy security questions from the accounts database 114, generates an authentication query message containing the registered security question and the decoy security questions, and communicates the authentication query message toward the user terminal 100 operated by a user. The processor receives from the user terminal 100 an authentication response message containing an answer from the user to at least the registered security question, and retrieves from the accounts database 114 a registered answer that is associated with the account identifier. The processor, such as through operation account manager circuitry 116, selectively allows electronic access by an access request message from the user terminal 100 to information stored in a data structure associated with the account identifier within the accounts database 114, based on whether the answer contained in the authentication response message to the registered security question matches the registered answer and based on whether another answer from the user to any of the decoy security questions is contained in the authentication response message.

In a further embodiment, the account server processor allows electronic access by an access request message from the user terminal 100 to the information stored in the data structure associated with the account identifier within the accounts database 114, responsive to determining that the answer contained in the authentication response message to the registered security question matches the registered answer and determining that the authentication response message contains no answer from the user to any of the decoy security questions. Thus, for example, when the user has correctly answered the registered security question and has correctly not answered any of the decoy security questions, the user is determined to be authentic and responsively the user is allowed to access information in the accounts database 114 by operating the user terminal 100 to communicate one or more access request messages to the account server 110.

In a further embodiment, the account server processor prevents electronic access by the access request message from the user terminal 100 to the information stored in the data structure associated with the account identifier within the accounts database 114, responsive to determining that another answer from the user to one of the decoy security questions is contained in the authentication response message and irrespective of whether the answer contained in the authentication response message to the registered security question matches the registered answer. Thus, for example, when the user has correctly answered the registered security question and but has answered one or more of the decoy security questions, the user is determined to be not authentic and responsively the user is prevented from accessing information in the accounts database 114 through the user terminal 100.

Figure 2:
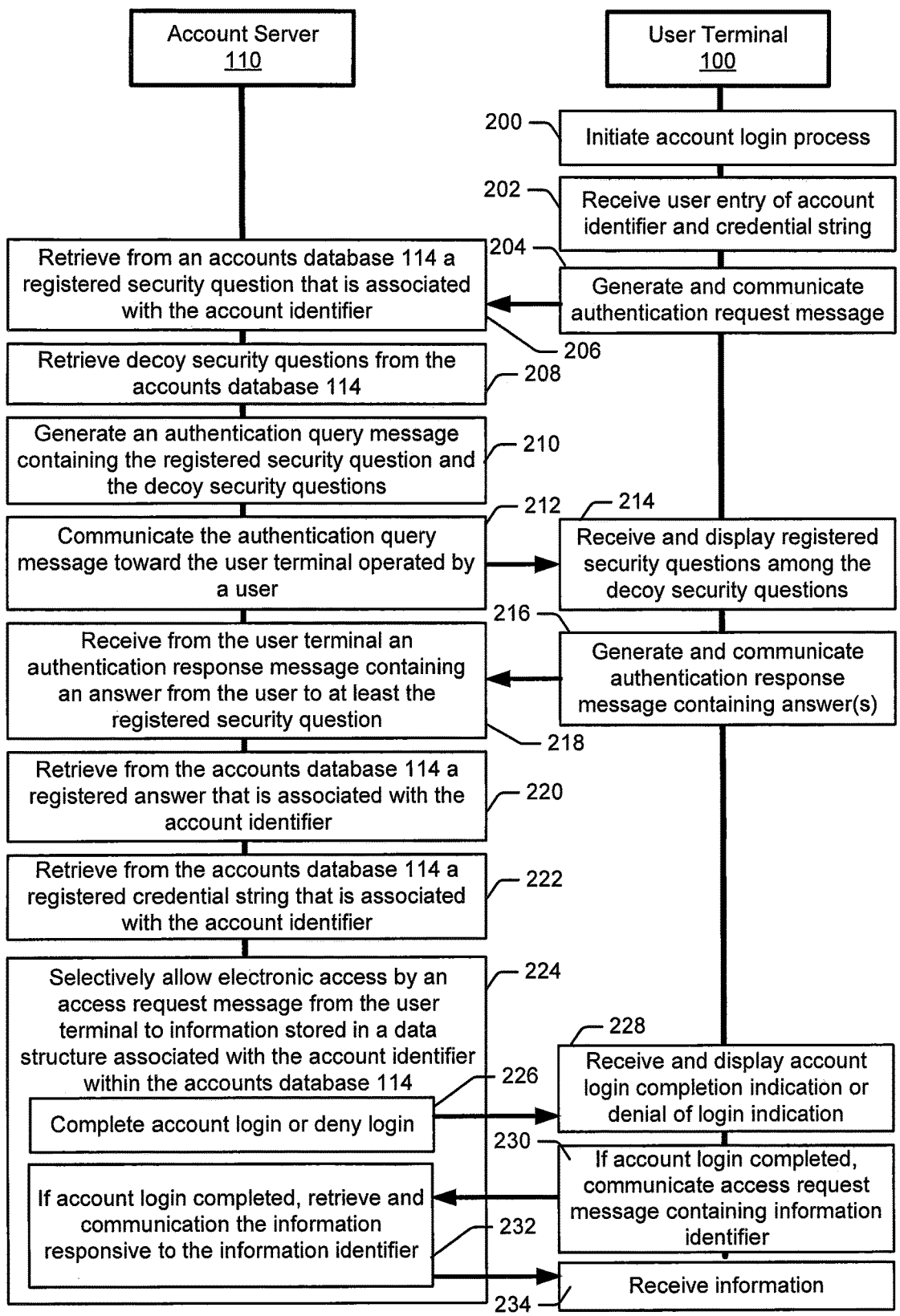
FIG. 2 illustrates a combined dataflow diagram and flowchart of operations that can be performed by the account server and user terminal of FIG. 1 to control electronic access to information stored in an accounts database according to some embodiments of the present disclosure.

FIG. 2 is a flowchart of operations that may be performed by a processor of the account server 110, such within the user authentication node 112, according to some embodiments of the present disclosure. Referring to FIG. 2, the user terminal 100 initiates an account login process (block 200), such as responsive to a user launching an application executed by the user terminal 100 or performing other operations through the user terminal 100. The user terminal 100 receives (block 202) user entry of an account identifier and a credentials string of characters (e.g., password). The user terminal 100 generates and communicates (block 204) an authentication request message containing the account identifier and the credentials string.

The account server 110 responds to the authentication request message by retrieving (block 206), from the accounts database 114, one or more registered security questions that is/are associated with the account identifier, and retrieves (block 208) decoy security questions from the accounts database 114 that account server 110. The account server 110 generates (block 210) an authentication query message containing the registered security question(s) and the decoy security questions, and communicates (block 212) the authentication query message towards the user terminal operated by the user.

Figures 3, 4:
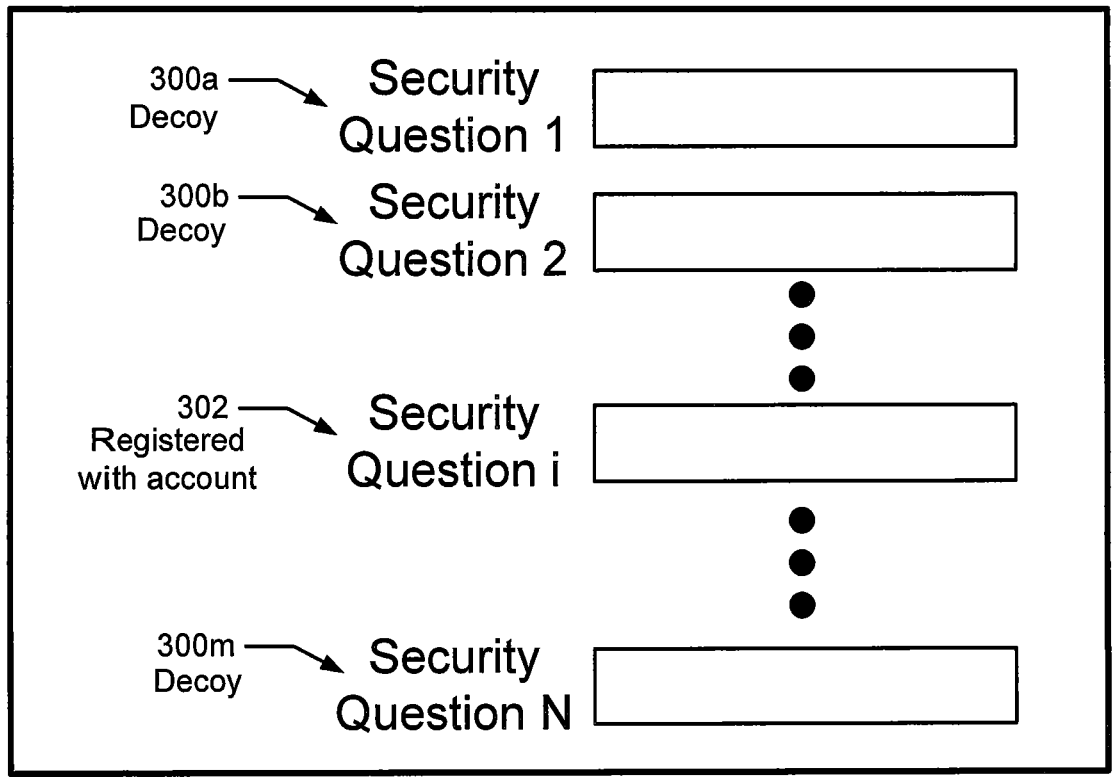
FIG. 3 illustrates a graphical screen that can be displayed on a display device of a user terminal during entry of a user's answers to security questions that include a registered security question intermingled among decoy security questions according to some embodiments of the present disclosure.
FIG. 4 illustrates an authentication response message that contains an answer from the user to at least the registered security question, and may further include elapsed time(s) associated with the user entering answer(s) and/or individual characters of answer(s), and/or an indication of a sequential order with which the user answered a plurality of displayed security questions in accordance with some embodiments of the present disclosure.

User terminal 100 receives, through the network interface 110, and displays the registered security question(s) intermingled among the decoy security questions on the display device 112. FIG. 3 illustrates a graphical screen that can be displayed on the display device 112 of the user terminal 100 during entry of a user's answer(s) to N security questions that include a registered security question 302 that is displayed intermingled among decoy security questions 300a, 300b, . . . 300m, according to some embodiments of the present disclosure. The illustrated authentication query message contains at least one registered security question, although it may contain more than one. The at least one registered security question must be properly answered by the user (e.g., user's answer(s) matches corresponding registered security answer(s)) to be determined to be authentic and allowed access to information in the accounts database 114. The security questions are displayed to the user without an indication of which of the security questions is a registered security question for which a correct answer corresponding to a registered answer in the accounts database 114 must be entered by the user in order to be identified as an authentic (authorized) user, and which of the security questions are decoy security questions for which any answer entered by the user will cause the account server 110 to identify the user as being non-authentic (non-authorized) and to responsively prevent access by the user to information stored in a data structure associated with the account identifier within the accounts database 114.

The user terminal 100 receives an answer entered by the user through the user interface 108 to the registered security question(s), and may further receive an answer to one or more of the decoy security questions. The user terminal 100 generates and communicates to the account server 110 an authentication response message containing the one or more answers entered by the user.

In some further embodiments, the user terminal 100 measures an elapsed time(s) associated with the user entering the answer(s) to the registered security question(s), and includes the elapsed time in the authentication response message communicated to the account server 110. The elapsed time can be measured between any pair of defined timing events, including one or more of: 1) the elapsed time between when a prompt is displayed (e.g., the registered security question is displayed) and the user enters a first character of an answer; 2) the elapsed time between when a prompt is displayed and the user enters an n'th character of the answer; and 3) the elapsed time between when a user enters an i'th character and when the user enters an n'th character of the answer.

FIG. 4 illustrates an authentication response message that is generated by the user terminal 100 and received by the account server 110, and which contains an answer from the user to at least the registered security question, and may further include elapsed time(s) associated with the user entering answer(s) and/or individual characters of answer(s), and/or an indication of a sequential order with which the user answered a plurality of displayed security questions in accordance with some embodiments of the present disclosure.

The account server 100 receives (block 218) from the user terminal 100 the authentication response message containing an answer from the user to at least the registered security question, and retrieves (block 220) from the accounts database 114 a registered answer that is associated with the account identifier. The account server 100, via the user authentication node 112 and the account manager 116, selectively allows electronic access by an access request message from the user terminal 100 to information stored in a data structure associated with the account identifier within the accounts database 114, based on whether the answer contained in the authentication response message to the registered security question matches the registered answer and based on whether another answer from the user to any of the decoy security questions is contained in the authentication response message.

In a further embodiment, the account server 100 also retrieves (block 222) a registered credential string from the accounts database 114 using the account identifier to identify where the registered credential string is stored. The account server 100 then selectively allows electronic access by an access request message to information stored in a data structure associated with the account identifier within the accounts database 114, based on whether the credential string matches the registered credential string, based on whether the answer contained in the authentication response message to the registered security question matches the registered answer, and based on whether another answer from the user to any of the decoy security questions is contained in the authentication response message.

Operations by the account server 110 to selectively allow electronic access can include completing (block 226) account login when the recited conditions are satisfied, and denying account login when any one or more of the recited conditions are not satisfied. The account server communicates a result of the account login determination to the user terminal 100. If account login is allowed to be completed, the user terminal 100 communicates (block 230) to the account server 110 an access request message containing an information identifier that is used by the account server 110 to retrieve identified information from the accounts database 114. The account server 110 responds to the access request message and completion of the login operations, by retrieving (block 232) and communicating the identified information for receipt (block 234) by the user terminal 100.

Figure 5:
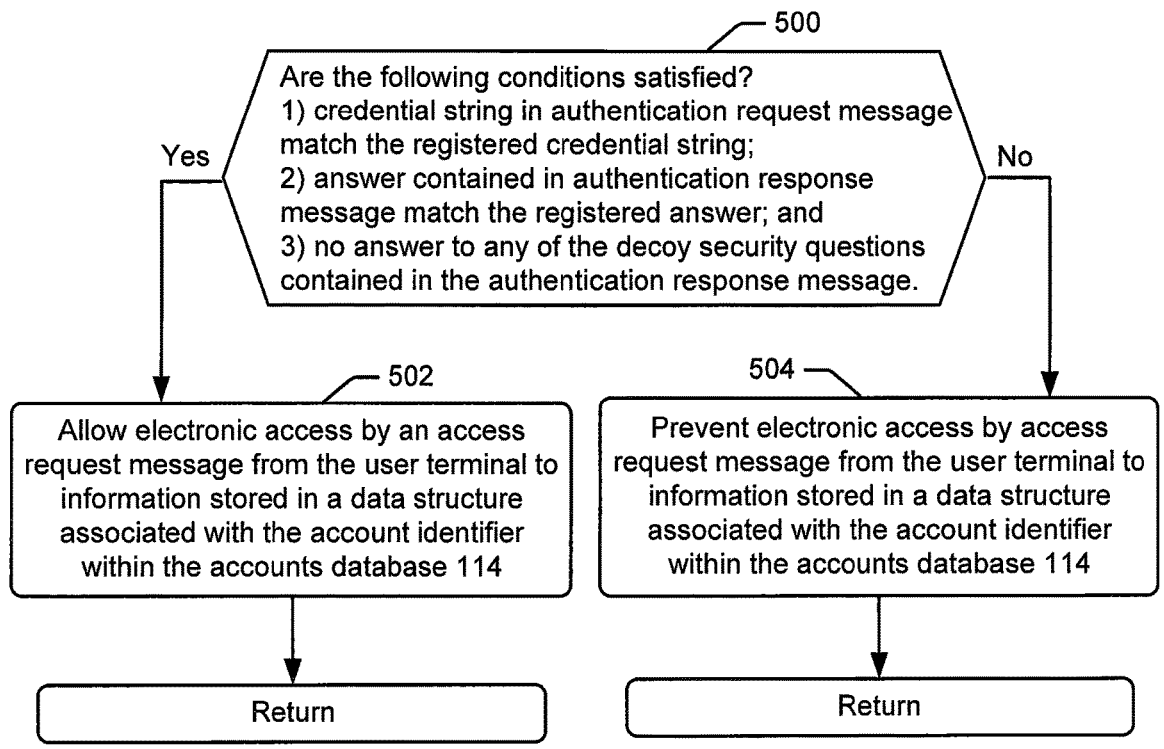
FIGS. 5-11 are flowcharts of operations that may be performed by an account server processor according to some embodiments of the present disclosure.

FIG. 5 illustrates a flowchart of further operations that may be performed by the account server 110 to control electronic access by an access request message from the user terminal in accordance with some embodiments. Referring to FIG. 5, the processor of the account server 110, e.g., within the user authentication node 112, determines (block 500) whether the following conditions are satisfied: 1) whether the credential string in the authentication request message matches the registered credential string; 2) whether the answer contained in the authentication response message matches the registered answer; and 3) whether there is no answer to any of the decoy security questions contained in the authentication response message. In each of these conditions is satisfied, the account server 110 allows (block 502) electronic access by an access request message from the user terminal 100 to information stored in a data structure associated with the account identifier within the accounts database 114. In sharp contrast, if any one or more of these conditions is not satisfied, the account server 110 prevents (block 504) electronic access by an access request message from the user terminal 100 to information stored in a data structure associated with the account identifier within the accounts database 114.

Figure 6:
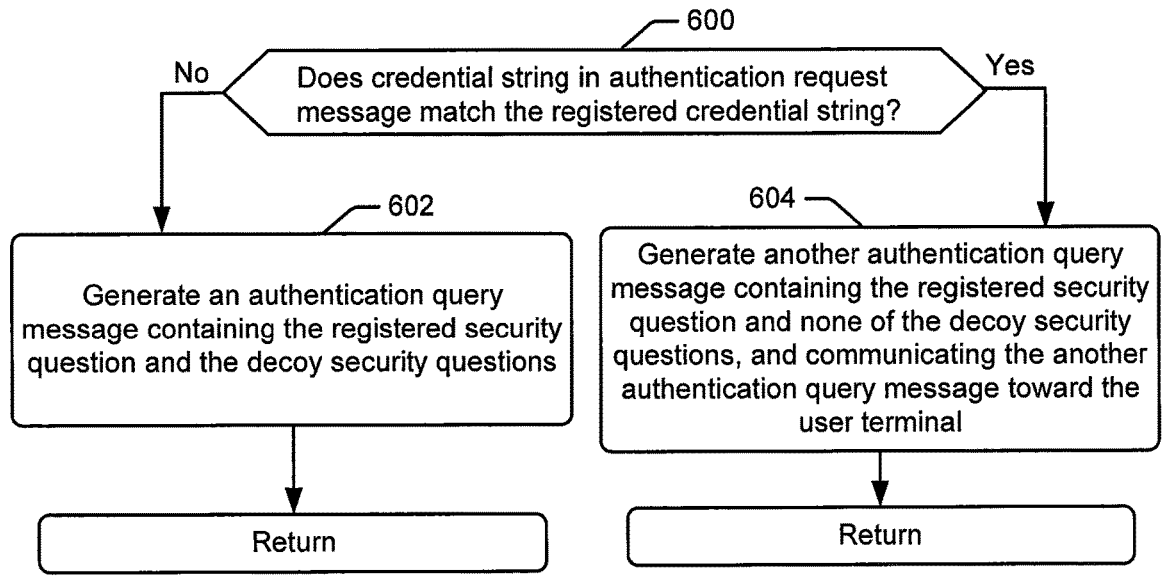

The account server 110 may selectively send decoy security questions to the user terminal 100 based on whether the credential string provided by the user in the authentication request message matches the registered credential string in a data structure stored in the accounts database 114 associated with the account identifier. Thus, for example, when a user enters an incorrect password or other credential string, the account server 110 can communicate a retry password notification to the user terminal 100 and furthermore include decoy security questions with the retry password notification, such as in an authentication query message, so that the user is provided with a further authentication challenge beyond just retrying the password. FIG. 6 illustrates a flowchart of further operations that may be performed by the account server 110 to generate (block 210, FIG. 2) the authentication query message.

Referring to FIG. 6, the processor of the account server 110, e.g., within the user authentication node 112, determines (block 600) whether the credential string in the authentication request message matches the registered credential string. When a match is not determined, the authentication query message is generated (block 602) containing the registered security question and the decoy security questions. In sharp contrast, when a match is determined, the authentication query message is generated (block 604) differently, referred to as another authentication query message, containing the registered security question and none of the decoy security questions. The message is communicated to the user terminal 100 to cause a user to provide one or more answers to the questions for use by the account server 110 to selectively allow (block 224, FIG. 2) electronic access to the information stored in the accounts database 114.

Figure 7:
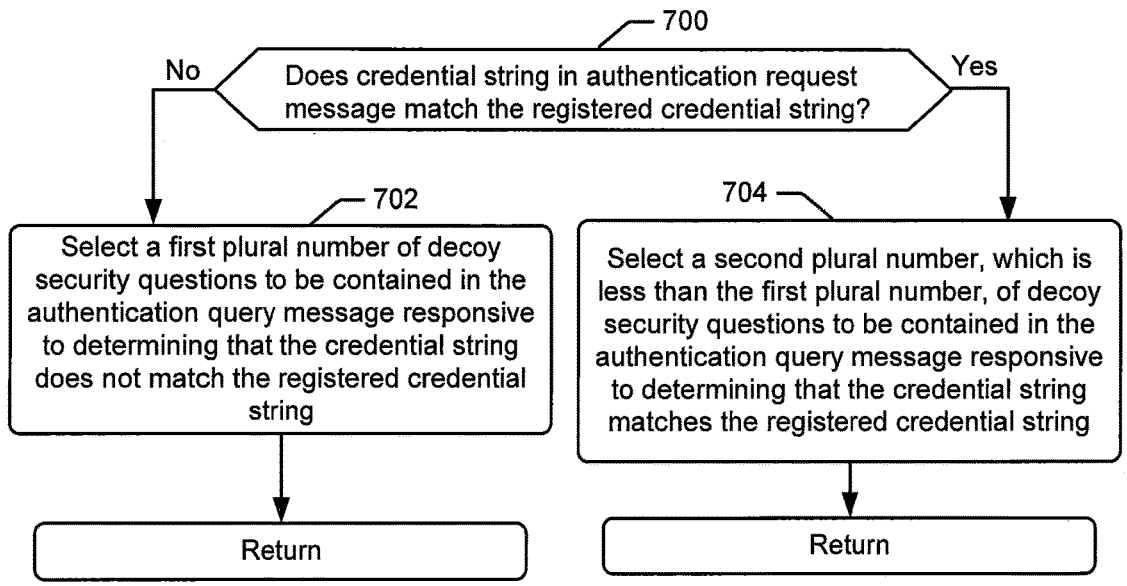

In some further embodiments, the account server 110 controls how many decoy security questions are contained in the generated authentication query message based on whether the credential string and authentication request message matches the registered credential string. FIG. 7 illustrates a flowchart of associated operations by the account server 110. Referring to FIG. 7, the processor of the account server 110 determines (block 700) whether the credential string in the authentication request message matches the registered credential string. When a match is not determined, the processor selects (block 702) a first plural number of decoy security questions to be contained in the authentication query message. In sharp contrast, when a match is determined, the processor selects (block 704) a second plural number, which is less than the first plural number, of decoy security questions to be contained in the authentication query message responsive.

Figure 8:
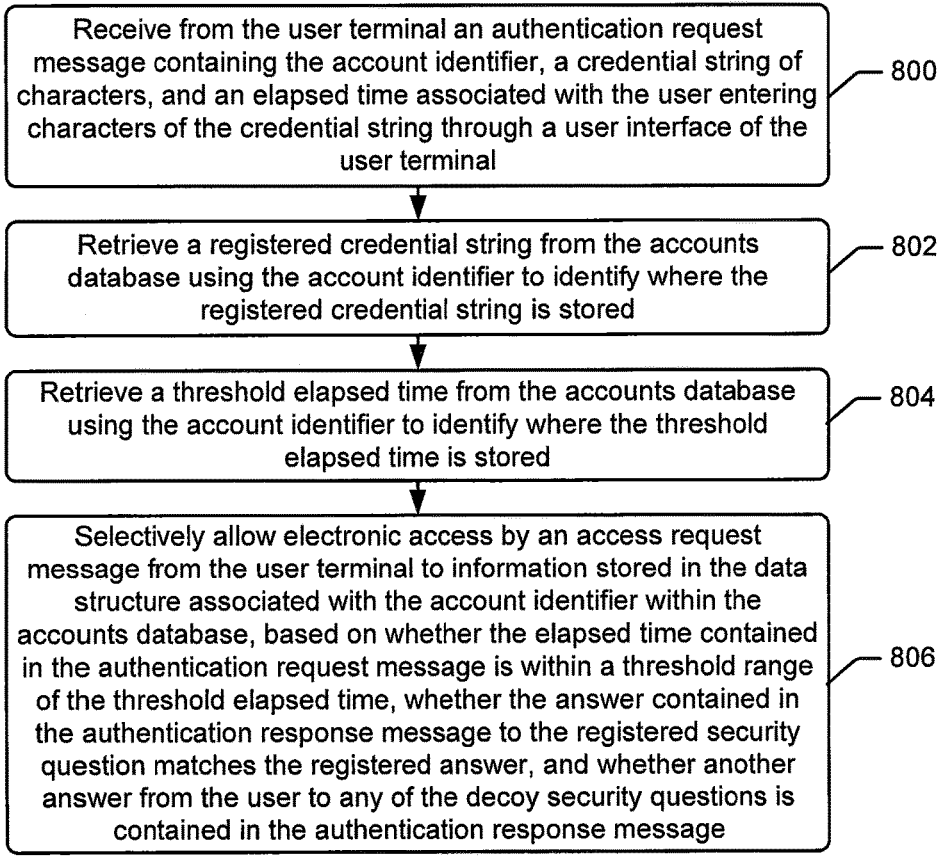

In some further embodiments, an elapsed time associated with user entering characters of the credential string is used by the account server 110 when authenticating the user and responsively controlling electronic access by the user terminal to information stored in the accounts database 114. FIG. 8 illustrates a flowchart of associated operations by the account server 110. Referring to FIG. 8, the processor of the account server 110 receives (block 800) from the user terminal 100 an authentication request message containing the account identifier, a credential string of characters, and an elapsed time associated with the user entering characters of the credential string through the user interface 108 of the user terminal 100. The processor retrieves (block 802) a registered credential string from the accounts database 114 using the account identifier to identify where the registered credential string is stored, and retrieves (block 804) a threshold elapsed time from the accounts database 114 using the account identifier to identify where the threshold elapsed time is stored. The processor then selectively allows (block 806) electronic access by an access request message from the user terminal 100 to information stored in the data structure associated with the account identifier within the accounts database 114, based on whether the elapsed time contained in the authentication request message is within a threshold range of the threshold elapsed time, whether the answer contained in the authentication response message to the registered security question matches the registered answer, and whether another answer from the user to any of the decoy security questions is contained in the authentication response message.

Figure 9:
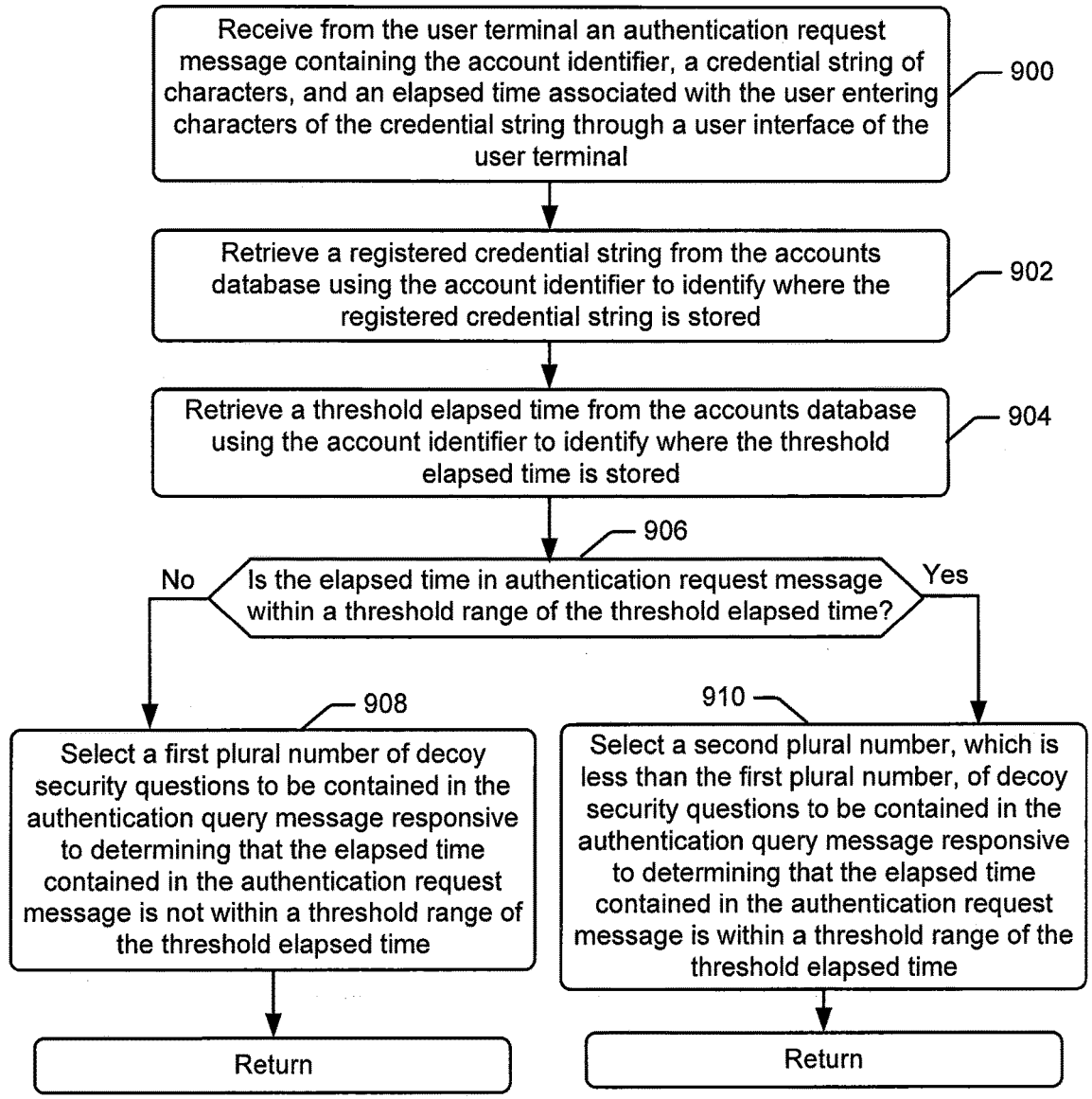

In some further embodiments, an elapsed time associated with user entering characters of the credential string is used by the account server 110 to control how many decoy security questions are contained in the generated authentication query message. For example, a greater number of decoy security questions can be provided to the user terminal 100 for display to the user when the elapsed time between two timing events associated with the user entering the credential string is not within a threshold margin of a registered elapsed time that the user may define during account registration and/or that has been learned over time by observing typical timing events for the authentic user when entering the credential string. FIG. 9 illustrates a flowchart of associated operations by the account server 110. Referring to FIG. 9, the processor of the account server 110 receives (block 900) from the user terminal 100 an authentication request message containing the account identifier, a credential string of characters, and an elapsed time associated with the user entering characters of the credential string through the user interface 108 of the user terminal 100. The processor retrieves (block 902) a registered credential string from the accounts database using the account identifier to identify where the registered credential string is stored, and retrieves (block 904) a threshold elapsed time from the accounts database 114 using the account identifier to identify where the threshold elapsed time is stored. The processor selects (block 908) a first plural number of decoy security questions to be contained in the authentication query message responsive to determining that the elapsed time contained in the authentication request message is not within a threshold range of the threshold elapsed time. In sharp contrast, the processor selects (block 910) a second plural number, which is less than the first plural number, of decoy security questions to be contained in the authentication query message responsive to determining that the elapsed time contained in the authentication request message is within a threshold range of the threshold elapsed time.

Figure 10:
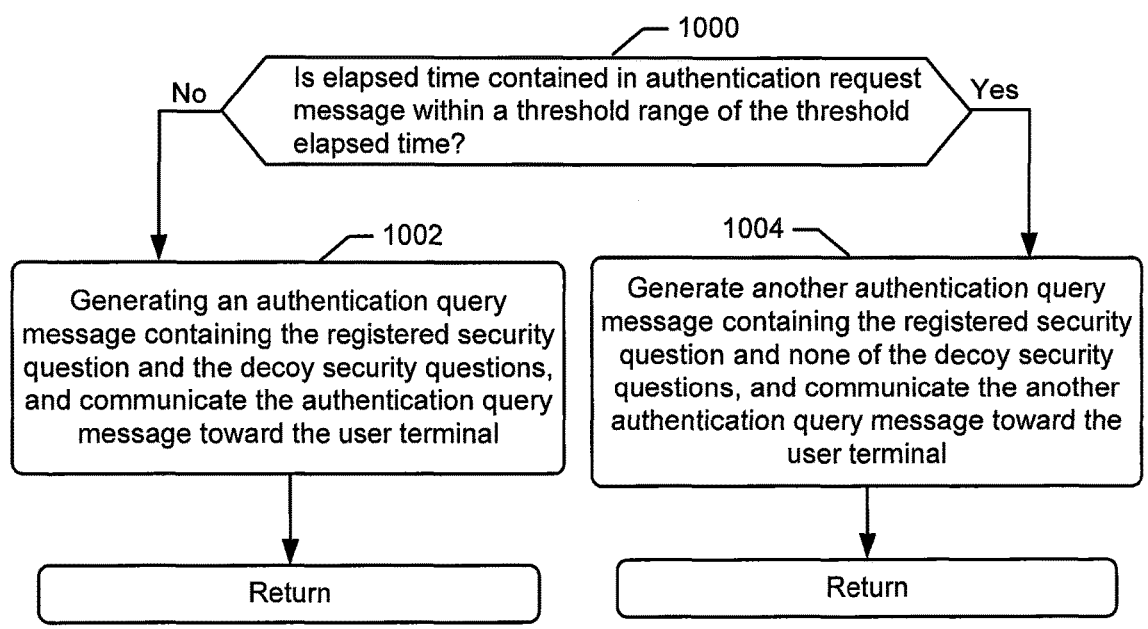

In some further embodiments, an elapsed time associated with user entering characters of the credential string is used by the account server 110 to control whether or not decoy security questions are contained in the generated authentication query message. FIG. 10 illustrates a flowchart of associated operations by the account server 110. Referring to FIG. 10, the processor of the account server 110 receives from the user terminal an authentication request message containing the account identifier, a credential string of characters, and an elapsed time associated with the user entering characters of the credential string through the user interface 108 of the user terminal 110. The processor retrieves a threshold elapsed time from the accounts database 114 using the account identifier to identify where the threshold elapsed time is stored. The processor determines (block 1000) whether the elapsed time contained in the authentication request message is within a threshold range of the threshold elapsed time. Responsive to determining that the elapsed time contained in the authentication request message is not within a threshold range of the threshold elapsed time, the processor generates (block 1002) the authentication query message containing the registered security question and the decoy security questions, and communicates the generated authentication query message toward the user terminal 100. In sharp contrast, responsive to determining that the elapsed time contained in the authentication request message is within a threshold range of the threshold elapsed time, the processor generates another authentication query message containing the registered security question and none of the decoy security questions, and communicates the generated authentication query message toward the user terminal 100.

In some further embodiments, the account server 110 authenticates a user and, responsively, selectively allows electronic access by the user through the user terminal 100 to information stored in the data structure associated with the account identifier stored in the accounts database 114, based on whether the user a list of security questions in a sequential order that corresponds to a registered sequential order for the user is stored in the accounts database 114 and/or based on an elapsed time associated with the user entering characters of the credential string for the user interface 108 of user terminal 100.

Figure 11:
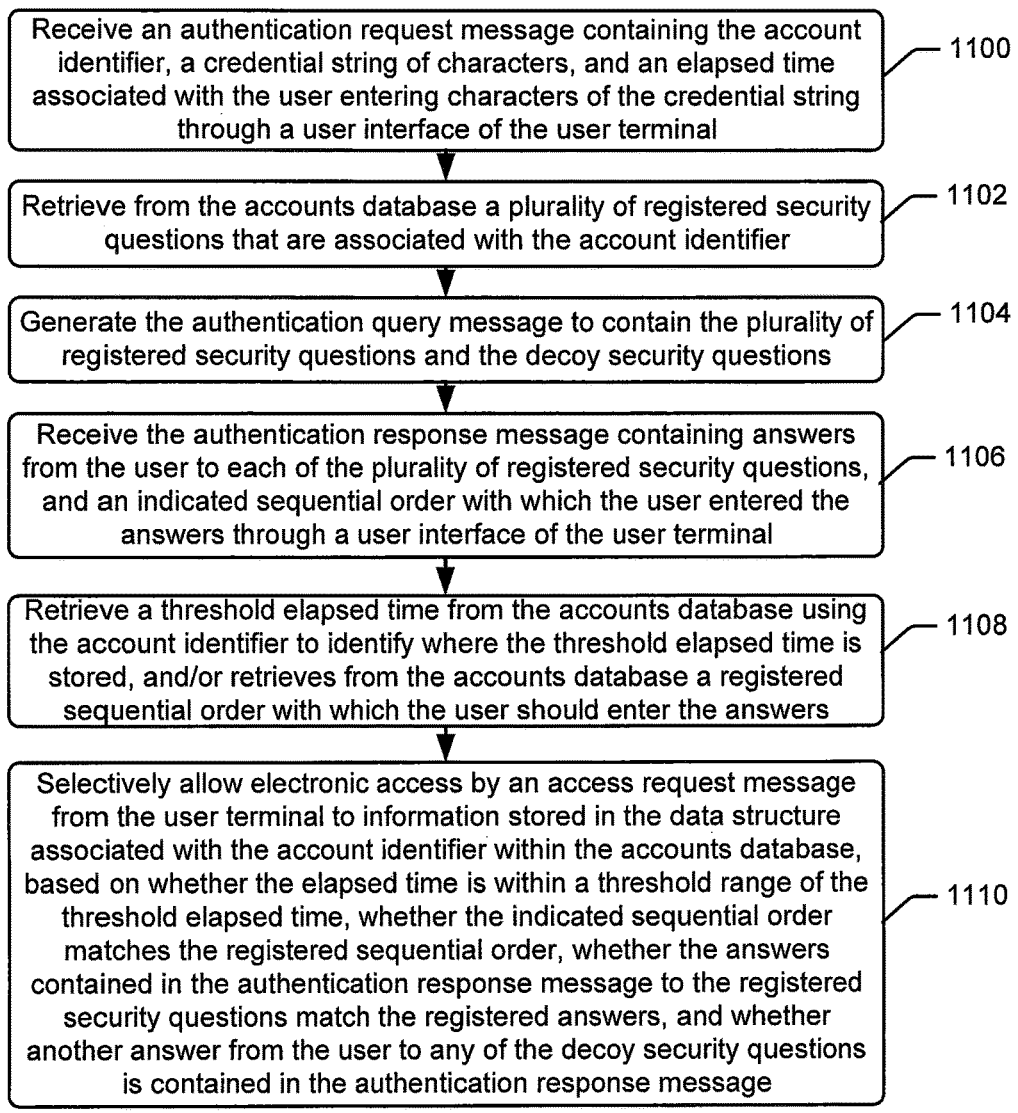

FIG. 11 illustrates a flowchart of associated operations by the account server 110. Referring to FIG. 11, the processor of the account server 110 receives (block 1100) an authentication request message containing the account identifier, the credential string of characters, and an elapsed time associated with the user entering characters of the credential string through the user interface 108 of the user terminal 100. The processor retrieves from the accounts database 114 a registered credential string using the account identifier to identify where the registered credential string is stored. The processor retrieves (block 1102) from the accounts database 114 a plurality of registered security questions that are associated with the account identifier. The processor generates (block 1104) the authentication query message to contain the plurality of registered security questions and the decoy security questions. The processor receives (block 1106) from the user terminal 100 the authentication response message containing answers from the user to each of the plurality of registered security questions, and an indicated sequential order with which the user entered the answers through the user interface 108 of the user terminal 100. The processor retrieves from the accounts database 114 for each of the plurality of registered security questions a registered answer that is associated with the account identifier and the registered security question, and retrieves (block 1108) from the accounts database 114 a registered sequential order with which the user should enter the answers and/or retrieves (block 1108) from the accounts database 114 a threshold elapsed time using the account identifier to identify where the threshold elapsed time is stored.

The processor then authenticates the user and, responsively, selectively allows (block 1110) electronic access by an access request message from the user terminal 100 to information stored in the data structure associated with the account identifier within the accounts database, based on whether the elapsed time is within a threshold range of the threshold elapsed time, whether the indicated sequential order matches the registered sequential order, whether the answers contained in the authentication response message to the registered security questions match the registered answers, and whether another answer from the user to any of the decoy security questions is contained in the authentication response message.

In a further embodiment, the user is authenticated and electronic access is selectively allowed (block 224 of FIG. 2) responsive to authentication of a combination of the credential string and an elapsed time for the user to enter a character at a defined location (e.g., a first character, an n'th character, etc.) in the credential string. The account server 110 may determine that the user is authentic only when the credential string matches a registered credential string associated with a user's account and the elapsed time matches (e.g., within a threshold range) of a threshold elapsed time defined for that particular location in the credential string. The account server 110 may authenticate a user based on elapsed time between when a prompt is displayed to a user to enter the credential string and when a first character of the credential string is entered. The user may have registered a threshold time of 2 seconds, and the account server 110 can then determine that a user is authentic only if the first character is entered within a threshold range (e.g., plus or minus about 2 milliseconds or other defined time) of 2 seconds following display of the prompt.

In another embodiment, the user is authenticated responsive to authenticating a combination of the credential string and an elapsed time for the user to enter characters at two different defined locations in the credential string. The account server 110 may determine that the user is authentic only when the credential string matches a registered credential string associated with a user's account and the elapsed time matches (e.g., within a threshold range) of a threshold elapsed time defined for between character entry for those locations in the credential string. The account server 110 may determine whether the user is authentic based on elapsed time between when a first character and a fourth character of the credential string which has more than four characters. The user may have registered a threshold elapsed time of 4 seconds, and the account server 110 can then determine that a user is authentic only if the fourth character is entered within a threshold range (e.g., plus or minus about 5 milliseconds or other defined time) of 4 seconds following entry of the first character. Alternatively, the threshold elapsed time may be learned over time by the account server 110 by observing typical timing between the entry of the first and then fourth characters.

Figure 12:
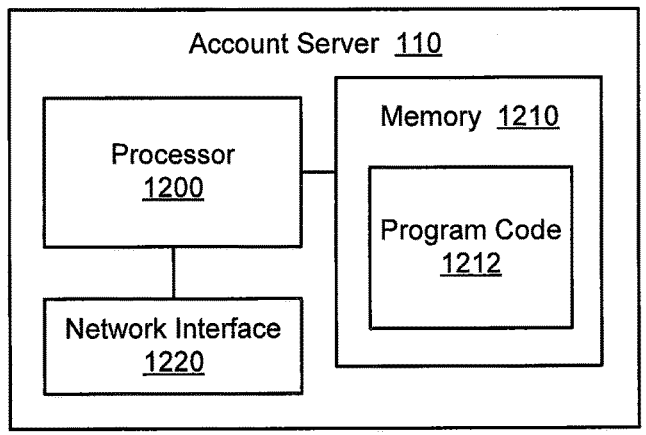
FIG. 12 is a block diagram of an account server configured according to some embodiments of the present disclosure.

FIG. 12 illustrates a block diagram of an account server 110 that is configured according to some embodiments. Referring to FIG. 12, the account server 110 includes a processor 1200, a memory 1210, and a network interface 1220. The processor 1200 may include one or more data processing circuits, such as a general purpose and/or special purpose processor (e.g., microprocessor and/or digital signal processor) that may be collocated or distributed across one or more networks. The processor 1200 is configured to execute computer program code 1212 in the memory 1210, described below as a non-transitory computer readable medium, to perform at least some of the operations described herein as being performed by an account server 110 or any component thereof. Any part of the components illustrated in the account server 110 may reside in another networked computer processing node and/or within the user terminal 100.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method, comprising:
performing operations as follows on an account server processor:
retrieving from an accounts database a registered security question that is associated with an account identifier received from a user terminal:
retrieving decoy security questions from the accounts database;
generating an authentication query message containing the registered security question and the decoy security questions;
communicating the authentication query message to the user terminal operated by a user;
receiving from the user terminal an authentication response message containing an answer from the user to at least the registered security question;
retrieving from the accounts database a registered answer that is associated with the account identifier; and
selectively allowing electronic access by an access request message from the user terminal to information stored in a data structure associated with the account identifier within the accounts database, based on whether the answer contained in the authentication response message to the registered security question matches the registered answer and based on whether another answer from the user to any of the decoy security questions is contained in the authentication response message,
wherein:
the retrieving from an accounts database a registered security question that is associated with an account identifier received from a user terminal, comprises:
retrieving from the accounts database a plurality of registered security questions that are associated with the account identifier;
the generating an authentication query message containing the registered security question and the decoy security questions, comprises:
generating the authentication query message to contain the plurality of registered security questions and the decoy security questions;
the receiving from the user terminal an authentication response message containing an answer from the user to at least the registered security question, comprises:
receiving from the user terminal the authentication response message containing answers from the user to each of the plurality of registered security questions, and an indicated sequential order with which the user entered the answers through a user interface of the user terminal;
the retrieving from the accounts database a registered answer that is associated with the account identifier, comprises:
retrieving from the accounts database for each of the plurality of registered security questions a registered answer that is associated with the account identifier and the registered security question;
further comprising retrieving from the accounts database a registered sequential order with which the user should enter the answers;
the selectively allowing electronic access comprises,
selectively allowing electronic access by an access request message from the user terminal to information stored in the data structure associated with the account identifier within the accounts database, based on whether the indicated sequential order matches the registered sequential order, whether the answers contained in the authentication response message to the registered security questions match the registered answers, and whether another answer from the user to any of the decoy security questions is contained in the authentication response message.

2. The method of claim 1, wherein the selectively allowing electronic access comprises:
preventing electronic access by the access request message from the user terminal to the information stored in the data structure associated with the account identifier within the accounts database, responsive to determining that another answer from the user to one of the decoy security questions is contained in the authentication response message and irrespective of whether the answer contained in the authentication response message to the registered security question matches the registered answer.

3. The method of claim 2, wherein the selectively allowing electronic access comprises:
allowing electronic access by an access request message from the user terminal to the information stored in the data structure associated with the account identifier within the accounts database, responsive to determining that the answer contained in the authentication response message to the registered security question matches the registered answer and determining that the authentication response message contains no answer from the user to any of the decoy security questions.

4. The method of claim 1, the operations further comprising:
receiving from the user terminal an authentication request message containing the account identifier and a credential string of characters; and
retrieving a registered credential string from the accounts database using the account identifier to identify where the registered credential string is stored,
wherein the selectively allowing electronic access by an access request message from the user terminal to information stored in a data structure associated with the account identifier within the accounts database, is further based on whether the credential string matches the registered credential string.

5. The method of claim 1, the operations further comprising:
receiving from the user terminal an authentication request message containing the account identifier and a credential string of characters;
retrieving a registered credential string from the accounts database using the account identifier to identify where the registered credential string is stored;
responsive to determining that the credential string does not match the registered credential string, performing the generating an authentication query message containing the registered security question and the decoy security questions; and
responsive to determining that the credential string does match the registered credential string, generating another authentication query message containing the registered security question and none of the decoy security questions, and communicating the another authentication query message toward the user terminal.

6. The method of claim 1, the operations further comprising:

receiving from the user terminal an authentication request message containing the account identifier and a credential string of characters;
retrieving a registered credential string from the accounts database using the account identifier to identify where the registered credential string is stored;
selecting a first plural number of decoy security questions to be contained in the authentication query message responsive to determining that the credential string does not match the registered credential string; and
selecting a second plural number, which is less than the first plural number, of decoy security questions to be contained in the authentication query message responsive to determining that the credential string matches the registered credential string.

7. The method of claim 1, the operations further comprising:
receiving from the user terminal an authentication request message containing the account identifier, a credential string of characters, and an elapsed time associated with the user entering characters of the credential string through a user interface of the user terminal;
retrieving a registered credential string from the accounts database using the account identifier to identify where the registered credential string is stored; and
retrieving a threshold elapsed time from the accounts database using the account identifier to identify where the threshold elapsed time is stored,
wherein the selectively allowing electronic access comprises,
selectively allowing electronic access by an access request message from the user terminal to information stored in the data structure associated with the account identifier within the accounts database, based on whether the elapsed time is within a threshold range of the threshold elapsed time, whether the indicated sequential order matches the registered sequential order, whether the answers contained in the authentication response message to the registered security questions match the registered answers, and whether another answer from the user to any of the decoy security questions is contained in the authentication response message.

8. A computer program product comprising a non-transitory computer readable medium storing program code that when executed by a processor of an apparatus causes the processor to perform operations comprising:
retrieving from an accounts database a registered security question that is associated with an account identifier received from a user terminal:
retrieving decoy security questions from the accounts database;
generating an authentication query message containing the registered security question and the decoy security questions;
communicating the authentication query message to the user terminal operated by a user;
receiving from the user terminal an authentication response message containing an answer from the user to at least the registered security question;
retrieving from the accounts database a registered answer that is associated with the account identifier;
selectively allowing electronic access by an access request message from the user terminal to information stored in a data structure associated with the account identifier within the accounts database, based on whether the answer contained in the authentication response message to the registered security question matches the registered answer and based on whether another answer from the user to any of the decoy security questions is contained in the authentication response message;

receiving from the user terminal an authentication request message containing the account identifier, a credential string of characters, and an elapsed time associated with the user entering characters of the credential string through a user interface of the user terminal;

retrieving a registered credential string from the accounts database using the account identifier to identify where the registered credential string is stored; and retrieving a threshold elapsed time from the accounts database using the account identifier to identify where the threshold elapsed time is stored, wherein the selectively allowing electronic access comprises, selectively allowing electronic access by an access request message from the user terminal to information stored in the data structure associated with the account identifier within the accounts database, based on whether the elapsed time contained in the authentication request message is within a threshold range of the threshold elapsed time, whether the answer contained in the authentication response message to the registered security question matches the registered answer, and whether another answer from the user to any of the decoy security questions is contained in the authentication response message.

9. A method, comprising:

performing operations as follows on an account server processor:

retrieving from an accounts database a registered security question that is associated with an account identifier received from a user terminal:

retrieving decoy security questions from the accounts database;

generating an authentication query message containing the registered security question and the decoy security questions;

communicating the authentication query message to the user terminal operated by a user;

receiving from the user terminal an authentication response message containing an answer from the user to at least the registered security question;

retrieving from the accounts database a registered answer that is associated with the account identifier;

selectively allowing electronic access by an access request message from the user terminal to information stored in a data structure associated with the account identifier within the accounts database, based on whether the answer contained in the authentication response message to the registered security question matches the registered answer and based on whether another answer from the user to any of the decoy security questions is contained in the authentication response message;

receiving from the user terminal an authentication request message containing the account identifier, a credential string of characters, and an elapsed time associated with the user entering characters of the credential string through a user interface of the user terminal;

retrieving a registered credential string from the accounts database using the account identifier to identify where the registered credential string is stored;

retrieving a threshold elapsed time from the accounts database using the account identifier to identify where the threshold elapsed time is stored;

selecting a first plural number of decoy security questions to be contained in the authentication query message responsive to determining that the elapsed time contained in the authentication request message is not within a threshold range of the threshold elapsed time; and selecting a second plural number, which is less than the first plural number, of decoy security questions to be contained in the authentication query message responsive to determining that the elapsed time contained in the authentication request message is within a threshold range of the threshold elapsed time.

10. A computer program product comprising a non-transitory computer readable medium storing program code that when executed by a processor of an apparatus causes the processor to perform operations comprising:

retrieving from an accounts database a registered security question that is associated with an account identifier received from a user terminal:

retrieving decoy security questions from the accounts database;

generating an authentication query message containing the registered security question and the decoy security questions;

communicating the authentication query message to the user terminal operated by a user;

receiving from the user terminal an authentication response message containing an answer from the user to at least the registered security question;

retrieving from the accounts database a registered answer that is associated with the account identifier;

selectively allowing electronic access by an access request message from the user terminal to information stored in a data structure associated with the account identifier within the accounts database, based on whether the answer contained in the authentication response message to the registered security question matches the registered answer and based on whether another answer from the user to any of the decoy security questions is contained in the authentication response message;

receiving from the user terminal an authentication request message containing the account identifier, a credential string of characters, and an elapsed time associated with the user entering characters of the credential string through a user interface of the user terminal;

retrieving a threshold elapsed time from the accounts database using the account identifier to identify where the threshold elapsed time is stored;

responsive to determining that the elapsed time contained in the authentication request message is not within a threshold range of the threshold elapsed time, performing the generating an authentication query message containing the registered security question and the decoy security questions; and responsive to determining that the elapsed time contained in the authentication request message is within a threshold range of the threshold elapsed time, the operations comprising:

generating another authentication query message containing the registered security question and none of the decoy security questions;

communicating the another authentication query message to the user terminal.

11. An account server comprising:
a network interface configured to communicate with user terminals through a data network;
a processor; and
a memory coupled to the processor and storing computer readable program code that when executed by the processor causes the processor to perform operations comprising:
  retrieving from an accounts database a registered security question that is associated with an account identifier received from a user terminal through the network interface;
  retrieving decoy security questions from the accounts database;
  generating an authentication query message containing the registered security question and the decoy security questions;
  communicating the authentication query message to the user terminal operated by a user;
  receiving from the user terminal through the network interface an authentication response message containing an answer from the user to at least the registered security question;
  retrieving from the accounts database a registered answer that is associated with the account identifier; and
  selectively allowing electronic access by an access request message from the user terminal through the network interface to information stored in a data structure associated with the account identifier within the accounts database, based on whether the answer contained in the authentication response message to the registered security question matches the registered answer and based on whether another answer from the user to any of the decoy security questions is contained in the authentication response message,
wherein:
  the retrieving from an accounts database a registered security question that is associated with an account identifier received from a user terminal, comprises:
    retrieving from the accounts database a plurality of registered security questions that are associated with the account identifier;
  the generating an authentication query message containing the registered security question and the decoy security questions, comprises:
    generating the authentication query message to contain the plurality of registered security questions and the decoy security questions;
  the receiving from the user terminal an authentication response message containing an answer from the user to at least the registered security question, comprises:
    receiving from the user terminal the authentication response message containing answers from the user to each of the plurality of registered security questions, and an indicated sequential order with which the user entered the answers through a user interface of the user terminal;
  the retrieving from the accounts database a registered answer that is associated with the account identifier, comprises:
    retrieving from the accounts database for each of the plurality of registered security questions a registered answer that is associated with the account identifier and the registered security question;
  further comprising retrieving from the accounts database a registered sequential order with which the user should enter the answers;
  the selectively allowing electronic access comprises,
    selectively allowing electronic access by an access request message from the user terminal to information stored in the data structure associated with the account identifier within the accounts database, based on whether the indicated sequential order matches the registered sequential order, whether the answers contained in the authentication response message to the registered security questions match the registered answers, and whether another answer from the user to any of the decoy security questions is contained in the authentication response message.

12. The account server of claim 11, wherein the selectively allowing electronic access comprises:
  preventing electronic access by the access request message from the user terminal to the information stored in the data structure associated with the account identifier within the accounts database, responsive to determining that another answer from the user to one of the decoy security questions is contained in the authentication response message and irrespective of whether the answer contained in the authentication response message to the registered security question matches the registered answer.

13. The account server of claim 12, wherein the selectively allowing electronic access comprises:
  allowing electronic access by an access request message from the user terminal to the information stored in the data structure associated with the account identifier within the accounts database, responsive to determining that the answer contained in the authentication response message to the registered security question matches the registered answer and determining that the authentication response message contains no answer from the user to any of the decoy security questions.

14. The account server of claim 11, the operations further comprising:
  receiving from the user terminal an authentication request message containing the account identifier and a credential string of characters; and
  retrieving a registered credential string from the accounts database using the account identifier to identify where the registered credential string is stored,
  wherein the selectively allowing electronic access by an access request message from the user terminal to information stored in a data structure associated with the account identifier within the accounts database, is further based on whether the credential string matches the registered credential string.

15. An apparatus comprising:
a network interface configured to communicate with user terminals through a data network;
a processor; and
a memory coupled to the processor and storing computer readable program code that when executed by the processor causes the processor to perform operations comprising:
  retrieving from an accounts database a registered security question that is associated with an account identifier received from a user terminal through the network interface;
  retrieving decoy security questions from the accounts database;

generating an authentication query message containing the registered security question and the decoy security questions;
communicating the authentication query message to the user terminal operated by a user;
receiving from the user terminal through the network interface an authentication response message containing an answer from the user to at least the registered security question;
retrieving from the accounts database a registered answer that is associated with the account identifier;
selectively allowing electronic access by an access request message from the user terminal through the network interface to information stored in a data structure associated with the account identifier within the accounts database, based on whether the answer contained in the authentication response message to the registered security question matches the registered answer and based on whether another answer from the user to any of the decoy security questions is contained in the authentication response message;
receiving from the user terminal an authentication request message containing the account identifier and a credential string of characters;
retrieving a registered credential string from the accounts database using the account identifier to identify where the registered credential string is stored;
selecting a first plural number of decoy security questions to be contained in the authentication query message responsive to determining that the credential string does not match the registered credential string; and
selecting a second plural number, which is less than the first plural number, of decoy security questions to be contained in the authentication query message responsive to determining that the credential string matches the registered credential string.

16. An account server comprising:
a network interface configured to communicate with user terminals through a data network;
a processor; and
a memory coupled to the processor and storing computer readable program code that when executed by the processor causes the processor to perform operations comprising:
retrieving from an accounts database a registered security question that is associated with an account identifier received from a user terminal through the network interface;
retrieving decoy security questions from the accounts database;
generating an authentication query message containing the registered security question and the decoy security questions;
communicating the authentication query message to the user terminal operated by a user;
receiving from the user terminal through the network interface an authentication response message containing an answer from the user to at least the registered security question;
retrieving from the accounts database a registered answer that is associated with the account identifier;
selectively allowing electronic access by an access request message from the user terminal through the network interface to information stored in a data structure associated with the account identifier within the accounts database, based on whether the answer contained in the authentication response message to the registered security question matches the registered answer and based on whether another answer from the user to any of the decoy security questions is contained in the authentication response message;
receiving from the user terminal an authentication request message containing the account identifier, a credential string of characters, and an elapsed time associated with the user entering characters of the credential string through a user interface of the user terminal;
retrieving a registered credential string from the accounts database using the account identifier to identify where the registered credential string is stored; and
retrieving a threshold elapsed time from the accounts database using the account identifier to identify where the threshold elapsed time is stored,
wherein the selectively allowing electronic access comprises,
selectively allowing electronic access by an access request message from the user terminal to information stored in the data structure associated with the account identifier within the accounts database, based on whether the elapsed time contained in the authentication request message is within a threshold range of the threshold elapsed time, whether the answer contained in the authentication response message to the registered security question matches the registered answer, and whether another answer from the user to any of the decoy security questions is contained in the authentication response message.

17. An apparatus comprising:
a network interface configured to communicate with user terminals through a data network;
a processor; and
a memory coupled to the processor and storing computer readable program code that when executed by the processor causes the processor to perform operations comprising:
retrieving from an accounts database a registered security question that is associated with an account identifier received from a user terminal through the network interface;
retrieving decoy security questions from the accounts database;
generating an authentication query message containing the registered security question and the decoy security questions;
communicating the authentication query message to the user terminal operated by a user;
receiving from the user terminal through the network interface an authentication response message containing an answer from the user to at least the registered security question;
retrieving from the accounts database a registered answer that is associated with the account identifier;
selectively allowing electronic access by an access request message from the user terminal through the network interface to information stored in a data structure associated with the account identifier within the accounts database, based on whether the answer contained in the authentication response message to the registered security question matches the registered answer and based on whether another answer from the user to any of the decoy security questions is contained in the authentication response message;

receiving from the user terminal an authentication request message containing the account identifier, a credential string of characters, and an elapsed time associated with the user entering characters of the credential string through a user interface of the user terminal;

retrieving a threshold elapsed time from the accounts database using the account identifier to identify where the threshold elapsed time is stored;

responsive to determining that the elapsed time contained in the authentication request message is not within a threshold range of the threshold elapsed time, performing the generating an authentication query message containing the registered security question and the decoy security questions; and responsive to determining that the elapsed time contained in the authentication request message is within a threshold range of the threshold elapsed time, the operations comprising:
  generating another authentication query message containing the registered security question and none of the decoy security questions;
  communicating the another authentication query message to the user terminal.

18. The account server of claim 11, the operations further comprising:
  receiving from the user terminal an authentication request message containing the account identifier, a credential string of characters, and an elapsed time associated with the user entering characters of the credential string through a user interface of the user terminal;
  retrieving a registered credential string from the accounts database using the account identifier to identify where the registered credential string is stored; and
  retrieving a threshold elapsed time from the accounts database using the account identifier to identify where the threshold elapsed time is stored,
  wherein the selectively allowing electronic access comprises,
    selectively allowing electronic access by an access request message from the user terminal to information stored in the data structure associated with the account identifier within the accounts database, based on whether the elapsed time is within a threshold range of the threshold elapsed time, whether the indicated sequential order matches the registered sequential order, whether the answers contained in the authentication response message to the registered security questions match the registered answers, and whether another answer from the user to any of the decoy security questions is contained in the authentication response message.

* * * * *